Feb. 15, 1949. C. L. WILQUIN 2,461,796
CHEESE SLICER
Filed Nov. 1, 1946
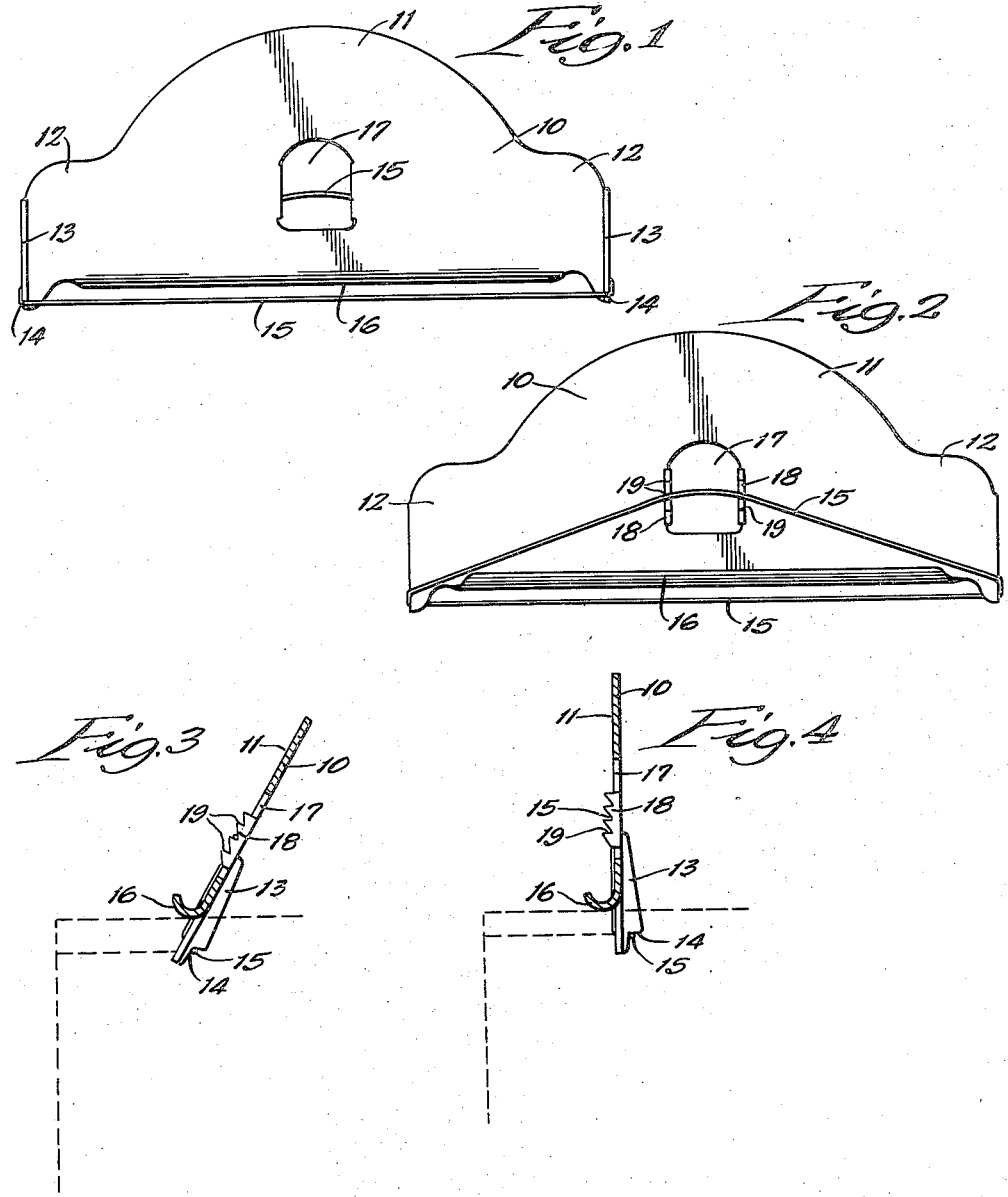
Inventor:
Carl L. Wilquin,
By Dawson, Booth and Spangenberg,
Attorneys.

Patented Feb. 15, 1949

2,461,796

UNITED STATES PATENT OFFICE 2,461,796

CHEESE SLICER

Carl L. Wilquin, Chicago, Ill.

Application November 1, 1946, Serial No. 707,170

7 Claims. (Cl. 30—116)

This invention relates to a cheese slicer. It is particularly useful in the slicing of cheese and similar plastic materials.

An object of the invention is to provide a slicer device of extremely simple and inexpensive construction wherein effective means are provided for slicing cheese and the like in thin slices and with a minimum of effort. A further object is to provide a slicer wherein a wire is maintained in a desired taut condition for the slicing of cheese in extremely thin slices and with a minimum of effort, while at the same time providing means for graduating the thickness of the slice. Other specific objects and advantages will appear as the specification proceeds.

The invention is illustrated, in a preferred embodiment, by the accompanying drawing, in which—

Figure 1 is a top plan view of a slicer device embodying my invention; Fig. 2, a bottom plan view; Fig. 3, a broken sectional view showing the slicer supported in one position for the cutting of a cheese loaf; and Fig. 4, a view similar to Fig. 3 but showing the slicer held in another position for cutting the cheese loaf.

In the illustration given, 10 designates a handle which is preferably formed of sheet metal having a rear arcuate portion 11 and wing portions 12. The extreme tips of the wings are turned rearwardly to form flanges 13, each having a notch or bridge 14 at its outer end adapted to receive the cutter wire 15.

The metal between the flanges 14 is preferably cut away and rolled rearwardly to provide a curved guide edge 16. The curved edge 16 provides a smooth surface for bringing against the loaf of cheese where it serves as a guide in the slicing operation. As a result of the cutting away of the metal and the rolling rearwardly of the edge 16, there is provided a space between the edge 16 and the cutter wire 15, and the flanges 14 extend forwardly beyond the roll-edge 16.

The handle 10 is cut away preferably at about the center thereof to form an opening 17, and a portion of the metal is turned rearwardly to provide adjustment flanges or members 18 having a series of notches or teeth 19.

In the operation of the device, the handle 11 is grasped by the hand and the roll-edge 16 is brought against the top edge portion of the cheese loaf. The handle is then drawn back so that the wire 15 passes through the cheese at a predetermined distance below the edge 16. By this means, an extremely even and accurate slice is obtained and one that may be of an extreme thinness. The slicing can be done with great speed because it is merely necessary to allow the guide edge 16 to rest against the cheese and to draw the handle rearwardly. Variations in the thickness of the slice can be produced by the angle at which the handle is held with respect to the loaf. The desired tautness of the wire 15 is obtained by drawing the wire 15 backwardly along the ratchet flanges 18 to any selected teeth 19.

The opening 17 is desirable not only as a means for providing the integral flanges 18, but also in providing a finger opening whereby the handle can be firmly held. The index finger or thumb may either be extended into the opening 17 so as to increase the firmness of the grip or, if desired, the finger may be pressed against the wire 15 to further increase its tautness if an extremely thin slice is desired.

It will be understood that the metal does not have to be entirely cut away to provide an opening 17. If desired, the metal may be simply pressed so as to form a depression, and the rearwardly-extending metal may be cut to form the locking notches for engagement with the wire. The thumb would thus be received within the depression and the depression would serve as effectively as opening 17 as a means for gripping the structure.

Should the wire 15 be broken, it may be readily replaced by another wire and secured in the desired taut relation by moving the rear portion thereof along the ratchet flanges 18 to the selected teeth 19, such replacement taking but a few seconds of time.

While in the foregoing description, I have set forth in considerable detail one embodiment of the invention for the purpose of illustration, it will be understood that such details may be varied widely by those skilled in the art without departing from the spirit of my invention.

I claim:

1. In a slicer device, a web handle member having forwardly-extending end flanges, the body of said handle having a curved portion extending between and to the rear of said flanges, a notched adjustment member carried by the rear side of said handle member, and a wire loop extending about and between said flanges and engaged by said notched member.

2. In a slicer device, a sheet metal handle member having forwardly-extending end flanges, the body of said handle having a curved edge portion extending between and to the rear of said flanges, a notched adjustment member carried by the rear side of said handle member, and a cutter loop extending about and between said flanges and having a rearwardly extending portion and engaged by said notched member.

3. In a slicer device, a sheet metal handle having forwardly-extending end flanges, the metal portion between said flanges being rolled back to form a curved guide edge, a notched adjustment member carried by the rear side of said handle, and a wire loop extending about and between said flanges and having a rearwardly extending portion engaging said notched member.

4. In a slicer device, a sheet metal handle having forwardly-extending end flanges, the metal portion between said flanges being rolled back to form a curved guide edge, an adjustment member carried by the rear side of said handle and having stepped notches therein, and a wire loop extending about and between said flanges and having a rearwardly extending portion engaging said notched member.

5. In a slicer device, a sheet metal handle having forwardly-extending end flanges, said handle having a central opening with rearwardly-turned serrated edges, and a wire loop extending between said flanges and having a portion engaging said serrated edges to maintain said wire in taut condition.

6. In a slicer device, a rigid flat member having forwardly-extending end flanges and having a finger opening formed therein, flanges extending rearwardly from the sides of said finger opening and provided with serrated edges, said handle having a curved guide edge extending between said flanges, and a cutter loop extending between said flanges and having a rearwardly extending portion engaging said serrated flange edges.

7. In a slicer device, a rigid flat member having forwardly-extending end flanges and having a depression formed therein adapted to receive the thumb or finger, the rearwardly-extending portion of the metal forming said depression being provided with serrated edges, and a wire loop extending between said flanges and having a rearwardly extending portion engaging said serrated edges to maintain said wire in taut condition.

CARL L. WILQUIN.

REFERENCES CITED

The following references are of record in the file of this patent:

UNITED STATES PATENTS

| Number | Name | Date |
| --- | --- | --- |
| 1,533,445 | Moller | Apr. 14, 1925 |
| 1,668,478 | Anderson | May 1, 1928 |
| 1,998,493 | De Vellier | Apr. 23, 1935 |